United States Patent
Testa et al.

(10) Patent No.: US 8,861,402 B2
(45) Date of Patent: Oct. 14, 2014

(54) OPTICAL TRANSPORT SWITCHING NODE WITH FRAMER

(75) Inventors: Francesco Testa, Rome (IT); Antonio D'Errico, Calci (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 358 days.

(21) Appl. No.: 13/502,128

(22) PCT Filed: Oct. 20, 2009

(86) PCT No.: PCT/EP2009/063751
§ 371 (c)(1),
(2), (4) Date: Jun. 20, 2012

(87) PCT Pub. No.: WO2011/047715
PCT Pub. Date: Apr. 28, 2011

(65) Prior Publication Data
US 2012/0250580 A1    Oct. 4, 2012

(51) Int. Cl.
*H04L 12/28*    (2006.01)
*H04J 14/02*    (2006.01)
*H04Q 11/00*    (2006.01)

(52) U.S. Cl.
CPC ......... *H04J 14/0201* (2013.01); *H04J 14/0267* (2013.01); *H04Q 11/0005* (2013.01); *H04J 14/0273* (2013.01); *H04J 14/0241* (2013.01); *H04J 14/0287* (2013.01); *H04J 14/0212* (2013.01)
USPC ........................................................ 370/254

(58) Field of Classification Search
None
See application file for complete search history.

(56) References Cited

U.S. PATENT DOCUMENTS

| | | | |
|---|---|---|---|
| 7,469,103 B2 | 12/2008 | Binetti et al. | |
| 8,290,373 B2* | 10/2012 | Aono | 398/135 |
| 2002/0186432 A1* | 12/2002 | Roorda et al. | 359/128 |
| 2003/0156840 A1 | 8/2003 | Uchikata | |
| 2008/0080860 A1* | 4/2008 | Katagiri | 398/43 |

(Continued)

FOREIGN PATENT DOCUMENTS

| | | |
|---|---|---|
| WO | 03/061164 A2 | 7/2003 |
| WO | 03/103204 A1 | 12/2003 |
| WO | 2008/101420 A1 | 8/2008 |

OTHER PUBLICATIONS

PCT International Search Report, dated Nov. 3, 2010, in connection with International Application No. PCT/EP2009/063751.

(Continued)

*Primary Examiner* — Chirag Shah
*Assistant Examiner* — Amar Persaud
(74) *Attorney, Agent, or Firm* — Leffler Intellectual Property Law, PLLC (57) ABSTRACT

A switching node for an optical communication system has an electrical switch, coupled to switch electrical signals from an input converter to a selected one of the outputs, and has a framer for reading or writing optical transport overhead information from or to the electrical signals. A bypass path is provided so that at least some of the signals being switched can bypass the framer. This can enable each node to be more efficient or handle more signals, since the framer no longer has to process all the signals. A reduction in power consumption can result. A method of configuring the switching node can involve a management system receiving information about the network, determining a new wavelength routing configuration and sending control signals to the node to configure the switches and control which signals use the bypass path.

14 Claims, 10 Drawing Sheets

(56) References Cited

U.S. PATENT DOCUMENTS

| | | |
|---|---|---|
| 2010/0028006 A1* | 2/2010 | Guy et al. .................... 398/79 |
| 2010/0221004 A1* | 9/2010 | Haslam et al. ................ 398/49 |
| 2011/0116790 A1* | 5/2011 | Sakauchi et al. .............. 398/5 |
| 2011/0164620 A1* | 7/2011 | Jinno et al. .................. 370/392 |
| 2014/0023373 A1* | 1/2014 | Tosaki ......................... 398/83 |

OTHER PUBLICATIONS

Basc, E.B. et al. "Architectural Tradeoff for Reconfigurable Dense Wavelength-Division Multiplexing Systems", JSTQE, vol. 12 N. 4 Jul./Aug. 2006, pp. 615-626.

"The Optical Switching Revival" Heavy Reading, vol. 7, No. 3, Mar. 2009.

"The DTN in Detail", Infinera Corporation, 2012 http://www.infinera.com/products/dtn_detail.html.

Melle, S. et al. "Network Planning and Architecture Analysis of Wavelength Blocking in Optical and Digital ROADM Networks", OFC, 2007.

Cortina Systems Product Brief "CS6001/2/3/4/5 Next Generation G.709 Optical Transport Processor Platform for 10G and 40G" Brief No. 400967-1.0, Cortina Systems, Inc., 2009.

ITU-T Recommendation G.798 "Series G: Transmission Systems and Media, Digital Systems and Networks, Digital terminal equipments—Other terminal equipment, Characteristics of political transport network hierarchy equipment functional blocks" Corrigendum 1, Jan. 2009.

ITU-T Recommendation G.7091/3 General; Series Y: Global Information Infrastructure, Internet Protocol Aspects and Next-Generation Networks, Internet protocol aspects—Transport, Interfaces for the Optical Transport Network (OTN) Amendment 3: 100 GBit/s support, one-stage multiplexing and other improvements, Apr. 2009.

\* cited by examiner

OPTICAL TRANSPORT SWITCHING NODE WITH FRAMER

FIELD OF THE INVENTION

This invention relates to switching nodes for use in an optical communication system, to such communication systems, to wavelength routing management systems, to subsystems of the switching nodes, and to methods of configuring the switching nodes.

BACKGROUND

Telecommunications systems, cable television systems and data communication networks use optical networks to rapidly convey large amounts of information between remote points. In an optical network, information is conveyed in the form of optical signals through optical fibers. Optical fibers are thin strands of glass capable of transmitting the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. In WDM, DWDM and other optical networks, arrayed waveguide gratings (AWGs), interleavers, and/or fibergratings (FGs) can be used to add and drop traffic at network nodes and to multiplex and demultiplex traffic at network nodes. To enable reconfiguring the wavelength paths to be dropped or added at different nodes, network nodes having optical switches can be provided, known as all optical ROADM (Reconfigurable Optical Add Drop Multiplexer) nodes.

Currently the optical transport network is deployed in metro and core networks by using such nodes with a high capacity optical transmission interface at 10 Gbps in metro networks and 40 Gbps optical interface for core networks. The use of an all optical ROADM provides the network with the flexibility needed to adapt the wavelength paths to the network changes without manual intervention. It also allows a decrease of node power consumption and footprint due to the all optical transparency of the channels transporting transit traffic that do not need any OEO conversion and consequent electronic processing.

All optical ROADM nodes are typically based on optical devices like WSS (Wavelength Selective Switch) or PLC (Planar Lightwave Circuit) switches [see ref 1] to achieve the needed network flexibility, high capacity and resilience.

All Optical ROADMs are not able to provide traffic grooming and sub-wavelength switching, hence additional equipments like digital cross-connects can be used.

In the last few years an alternative concept has been introduced for the implementation of ROADM nodes, namely the 'Digital ROADM' concept [see ref 2].

In a digital ROADM, the incoming multiplexed optical signals are demultiplexed, O-E converted and processed by OTN (optical transport network) framers in the transponder units. Grooming and switching of the different signals is performed by the electrical switch while OTN processing and E-O conversion is accomplished before the optical multiplexing at the node output.

In the Digital ROADM node the two functions of optical transport and traffic grooming are integrated in single OEO switching equipment in which all the incoming traffic is OEO converted and subsequently processed independently if it is pass-through or locally added/dropped [see ref 3].

It has been appreciated that DWDM does not provide its own overhead for management nor protection schemes to recover from equipment failures. DWDM involves more network elements than earlier point to point optical links. Such elements, such as—optical amplifiers, multiplexers, and demultiplexers—and dispersion compensation units, can bring reliability concerns and warrant monitoring. As a result, the G.709 Optical Transport Network, or OTN standard was generated by the International Telecommunication Union Telecommunication Standardization (ITU-T) to provide management functionality for DWDM optical networks. OTN involves adding a frame of overhead information, (also called a digital wrapper), some to the front of the signal as a header, and some such as FEC (Forward Error Correction) as a trailer appended to the rear. The FEC can extend optical span distances by reducing bit error rates (BERs). U.S. Pat. No. 7,469,103 shows an example of a node providing transparent add drop multiplexing, with a framer to provide the digital wrapper. The framer is arranged to process all outgoing and all incoming signals as soon as they have been wavelength demultiplexed and converted to electrical form.

REFERENCES

[1] E. B. Basc, R. Egorov, S. Gringeri and S. Elby: 'Architectural Tradeoff for Reconfigurable Dense Wavelength-Division Multiplexing Systems', JSTQE, Vol. 12 N. 4 July/August 2006, pp. 615-626.
[2] Heavy Reading, Vol. 7, No 3, March 2009, "The Optical Switching Revival"
[3] http://www.infinera.com/products/dtn_detail.html
[4] S. Melle, V. Vusirikala: Network Planning and Architecture Analysis of Wavelength Blocking in Optical and Digital ROADM Networks. OFC 2007.

SUMMARY OF THE INVENTION

An object of the invention is to provide improved apparatus or methods. According to a first aspect, the invention provides:

a switching node for an optical communication system, the switching node having an optical input path, and an optical output path, and at least one other output, of optical or other type, and having an input converter to convert optical signals on the optical input path to electrical input signals, an output converter to convert output electrical signals to output optical signals, and having an electrical switch, coupled to switch electrical signals from the input converter to a selected one of the outputs, the switching node also having a framer for reading or writing optical transport overhead information from or to the electrical signals, the framer being coupled so as to provide a bypass path so that at least some of the signals being switched by the electrical switch can be switched selectively onto the bypass path to bypass the framer and be output without reading or writing of their optical transport overhead information.

This can enable each node to be more efficient or handle more signals, since the framer no longer has to be provisioned to process all the signals in the node. As the framer can consume a considerable amount of power, this can provide a reduction in power consumption by avoiding using the framer for some signals. This is based on a recognition that some signals need not undergo processing of the overhead information at every node, as they may not need the digital regeneration which can occur by using the optical transport overhead information for carrying out FEC processing or digital monitoring for example.

Any additional features can be added to those discussed above, and some are described in more detail below.

Another aspect of the invention can involve an optical communications system having multiple nodes, at least some of the nodes comprising a switching node as set out above. Another aspect of the invention can involve a wavelength routing management system for the optical communications system, the routing management system being coupled to a switching node of the optical communications system to receive information based on optical transport overhead information received at the node, or optical characteristics monitored at the node, the routing management system also being arranged to send control signals to configure the switching node to configure which of the electrical signals are added or dropped or passed through.

Another aspect of the invention can involve a subsystem comprising part of a switching node as set out above, for add drop multiplexing, the subsystem having the add drop interface, the framer coupled to the add drop interface, and an interface for coupling the framer to the electrical switch, so that the framer can read or write optical transport overhead information of signals added or dropped, and signals that are passed though by the electrical switch can bypass the framer and pass though without reading or writing of their optical transport overhead information.

Another aspect of the invention can involve a method of configuring a switching node as set out above, in an optical communications system, the method having the steps of receiving information based on optical transport overhead information received at the node, or optical characteristics monitored at the node, and sending control signals to configure the switching node to configure which of the electrical signals are switched to bypass the framer. Another aspect can provide a method of configuring the switching node can involve a management system receiving information about the network, determining a new wavelength routing configuration and sending control signals to the node to configure the switches and control which signals use the bypass path.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DESCRIPTION OF THE PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

DEFINITIONS

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Elements or parts of the described nodes or networks may comprise logic encoded in media for performing network and/or node monitoring, failure detection, protection switching and loopback or localized testing functionality of the network 200. Logic may comprise software encoded in a disk or other computer-readable medium and/or instructions encoded in an application specific integrated circuit (ASIC), field programmable gate array (FPGA), or other processor or hardware.

References to add drop interfaces are intended to encompass inputs and outputs to local devices, data sources or data consumers, as opposed to other nodes of the optical transport network. It does not necessarily imply that the interfaces have a lower bandwidth than the other inputs or outputs to the other nodes.

References to ROADMs can encompass any type of reconfigurable multiplexer or demultiplexer capable of interfacing with another device or network outside the optical network, regardless of how many directions it has.

References to switching nodes can encompass any kind of switching node, not limited to the types described, not limited to any level of integration, or size or bandwidth or bit rate and so on.

References to framing or a framer, are not intended to be limited to framing which involves both a header and a tail, it could encompass one without the other.

References to framing or to optical transport overhead information are not intended to be limited to those meeting the G.709 standard, and are intended to encompass other types which may perform similar functions.

References to WDM are intended to encompass DWDM or any type of WDM unless the context requires otherwise.

References to software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

Introduction

By way of introduction to the embodiments, some issues with conventional designs will be explained.

According to conventional practice, in a possible all-optical ROADM design, the incoming optical multiplexed signals are optically amplified and sent to the WSS/PLC switch that separates the transit wavelength signals from the local wavelength signals to be dropped in the node. The aggregated transit wavelengths are sent to the boost amplifier for transmission toward the next node while the aggregate dropped wavelength are demultiplexed, O-E converted and processed by OTN framers in the transponder units. Local wavelength, to be added in the node, are also sent to WSS/PLC switch and multiplexed together with the transit wavelengths and transmitted.

All Optical ROADMs are affected by the following main limitations:
  degradation of the optical signal quality due to the transit through different nodes without regeneration
  wavelength blocking when two signals, coming from two different directions into the node and with the same wavelength, have to be directed to the same output fiber.
  Complex monitoring circuits added in the node due to the all-optical nature of the pass-through signals.

The above limits affect both the CAPEX and OPEX and the following actions are sometimes needed to counteract them:
  the overbuilding of HW equipments for the regenerations and/or wavelength conversions
  manual intervention needed in case additional HW (regenerators, wavelength converters) to be deployed and provide new services thus complicating the realization of a fully automated Control Plane for controlling the optical network and controlling layer 3 and above networks and applications running on the optical network.

Digital ROADMs solve most of the above issues providing a network with reduced engineering complexity, increased service flexibility without the need of network pre-planning [see reference 4] but this is achieved at the expense of efficiency in energy consumption. In fact all the incoming traffic is first converted into electrical domain and then processed by OTN framers which include FEC processing.

Embodiments of the invention can keep low the power consumption in the ROADM nodes by limiting OTN frame processing to those signals which need such OTN frame processing. In some embodiments, transmission robustness can be improved with signal regeneration for those signals which bypass the framer.

OTN processing is a power consuming operation, partly because it involves processing signals at the highest line rates. In Optical Transport nodes, OTN framers can prove to be the devices with the highest power consumption. In current practice 3-4 watts per each 10 Gbps interface are typically dissipated by the OTN framer ASICs.

Figure 1:
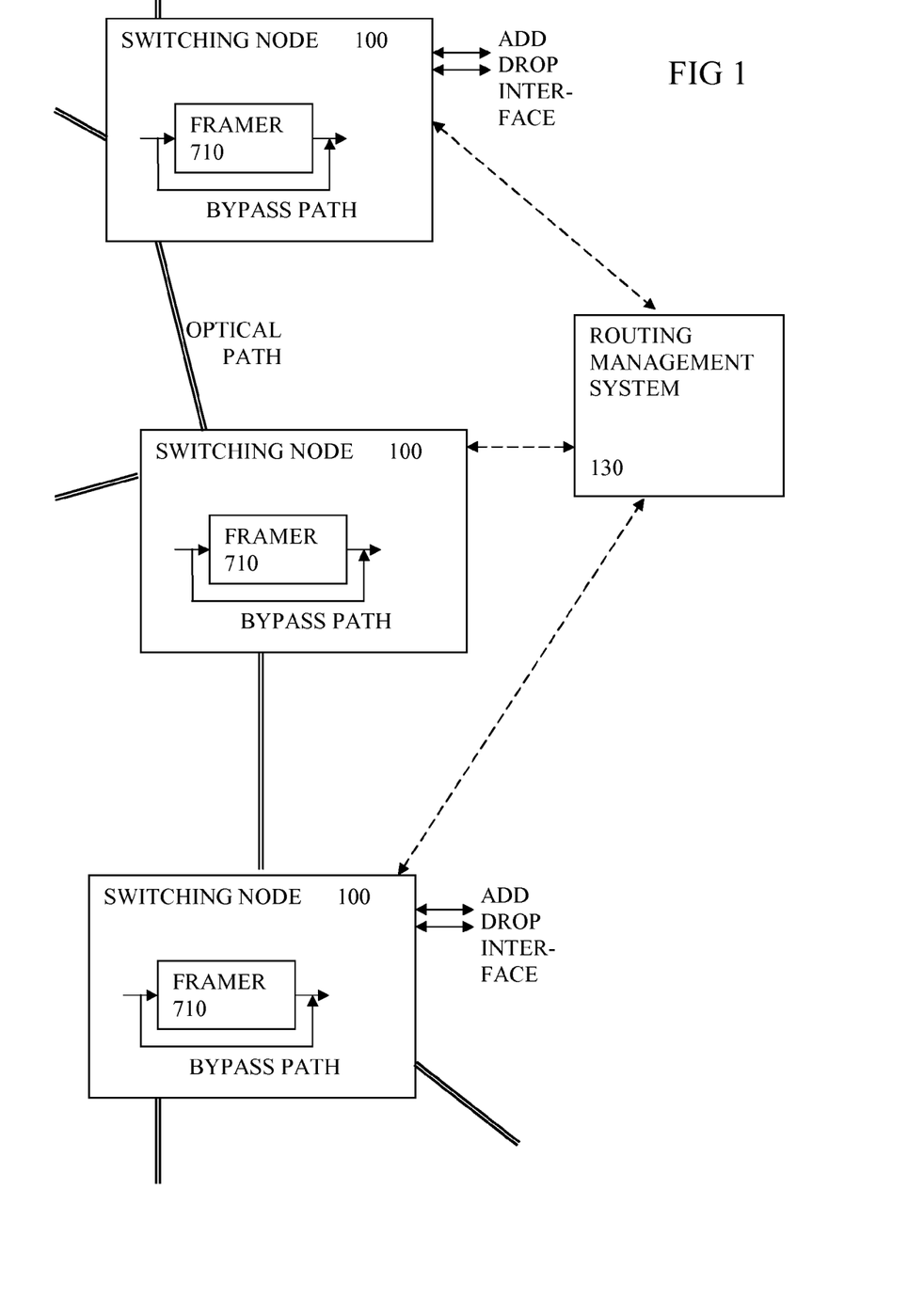
FIG. 1 shows a schematic view of a number of switching nodes in an optical network according to an embodiment.

FIG. 1, Network View According to an Embodiment

FIG. 1 shows a schematic view of a number of switching nodes in part of an optical network according to an embodiment. Three switching nodes 100 are shown, with optical paths between the nodes. Other nodes are not shown. Some possible implementations of the nodes are explained below in more detail with reference to FIGS. 2 to 11. Each of the switching nodes may be ROADMs or OXCs for example. The switching nodes can route communications traffic from one optical path to another, or can add or drop traffic from or to an add drop interface, which may be coupled to a local network for example. In the figure, an upper one and a lower one of the switching nodes is shown with an add drop interface, and a middle switching node is shown without such an interface. A routing management system 130 is typically provided, coupled to all the nodes, to control the configuration of switches in the nodes. This may be centralized or at least partly distributed. It can be implemented using conventional communications links of low bandwidth and typically slower than and independent of those used for the communications traffic. The routing management system can be implemented as software running on PCs or other conventional processing equipment. Some of its operation is described in more detail below with reference to FIG. 13. Some or all of the switching nodes can have a framer 710 for carrying out OTN framing operations such as reading digital monitoring or management data or carrying out FEC operations to correct bit errors. A bypass path is shown in these nodes so that some of the signals carrying the communications traffic can avoid the framer, and thus reduce the amount of processing involved. The selection of whether the signals take the bypass path can be determined according to a variety of parameters. For example it may depend on the output path taken, or may be independent of the output path. It can depend on how far or via how many nodes the signal has traveled since the last time it was processed by a framer for example. This can be determined by the routing management system for example.

ITU-T G. 798 specifies system architecture of OTN products, and reference can be made to this document for embodiments to meet that standard. But it does not specify standards for 3R regeneration without OTN frame processing for some paths. By introducing the possibility of some paths having frame processing, to an existing network not having any such frame processing, merely 2R or 3R regeneration, it becomes possible to gradually upgrade an existing network. For example it could have its longest paths or most valuable paths switched to go through framers and be subject to frame processing, to improve optical performance or enable greater reach, without having the expense and disruption of converting the entire network at one time.

Additional Features of Some Embodiments

In some embodiments, the switching node has a regenerator (415, 510, 720, 730), for analog regeneration of at least some of the electrical signals switched onto the bypass path. This can enable bypass signals to have analog regeneration (such as 2R regeneration involving reshaping, or 3R regeneration involving reshaping and retiming) which can extend reach/reduce errors/increase noise margins. This can simplify optical power management, and involve lower power consumption than digital regeneration by OTN frame processing for example. Retiming of pulses of at least some of the electrical signals can provide better analog regeneration than merely correcting distortions of the pulse shape. The regeneration may be provided separately for the bypass signals, to enhance them since they will not be enhanced by the frame processing.

In some embodiments, the switching node is arranged as a reconfigurable add drop multiplexer and has an add/drop interface, the electrical switch, being coupled to the input converter to selectively add electrical signals from the add/drop interface to the output converter, or to drop the electrical input signals to the add/drop interface, or to pass the electrical input signals through to the output converter. This is useful to enable signals to enter or leave the optical network. This can encompass nodes having any number of input or output paths (also called directions), so include ROADM products, sometimes classified as having 4 or 9 directions, and also OXC products, sometimes classified as nodes having more than 9 directions.

In some embodiments, the framer can be coupled at an add drop interface side of the electrical switch to read or write optical transport framing information from or to at least some of the electrical signals being added or dropped, and the bypass path comprising a path for the electrical signals being passed though the add drop multiplexer without being added or dropped. This can mean there is no need for an additional switch to select a bypass path.

The optical transport overhead information can comprise any of the following: forward error correction information, path monitoring information, quality of service information, tandem connection information, optical section information, optical subnetwork information, and protection switching information or other similar information which can be used for monitoring the optical paths or used to enhance the electrical signals by digital regeneration or error correction and so on, transparently to the format or standard of the useful payload of communications traffic. Reference is made to the G.709 standard for more details of these types of overhead and their associated processing.

In some embodiments the switching node has a wavelength demultiplexer coupled to the optical input path for separating wavelengths from a wavelength multiplexed input optical signal. This is known to increase transmission capacity between nodes, and can make it more important and valuable to ensure the nodes can handle more traffic more efficiently, such as by enabling framer bypass. The features described above can also be of benefit in systems not using WDM.

In some embodiments, the electrical switch is arranged to switch the electrical signals to carry out wavelength routing of the separated wavelengths. This is a convenient unit of granularity for the switch, but others are possible such as sub wavelength units or groups of wavelengths.

In some embodiments, at least the input converter or output converter comprises a photonic integrated circuit. This can help make each node more compact and efficient, and can make it more important and valuable to ensure the nodes can handle more traffic more efficiently, such as by enabling framer bypass.

In some embodiments, there is a monitor coupled to the electrical input signal for detecting optical characteristics of the input optical path based on the electrical input signal. This can be useful to detect degradations or changes in degradations in the optical path, sometimes before they deteriorate enough to cause bit errors. Monitoring for optical degradations using the electrical signals can be much more convenient than direct optical monitoring since the electrical type monitoring avoids the need for an optical tap, and for an equalizing amplifier and so on.

Figure 2:
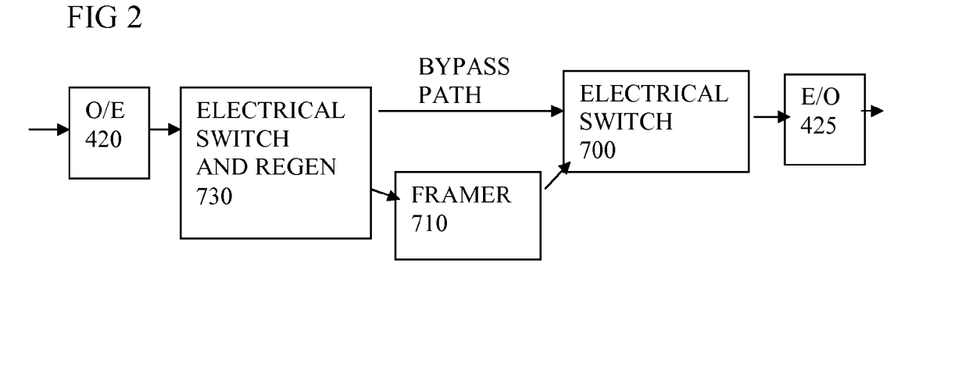
FIGS. 2, 3, and 4 show schematic views of alternative arrangements of a switching node according to embodiments.
Figure 3:
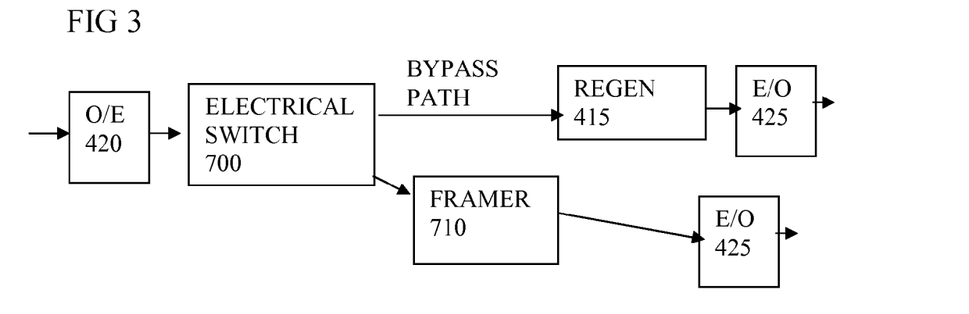
Figure 4:
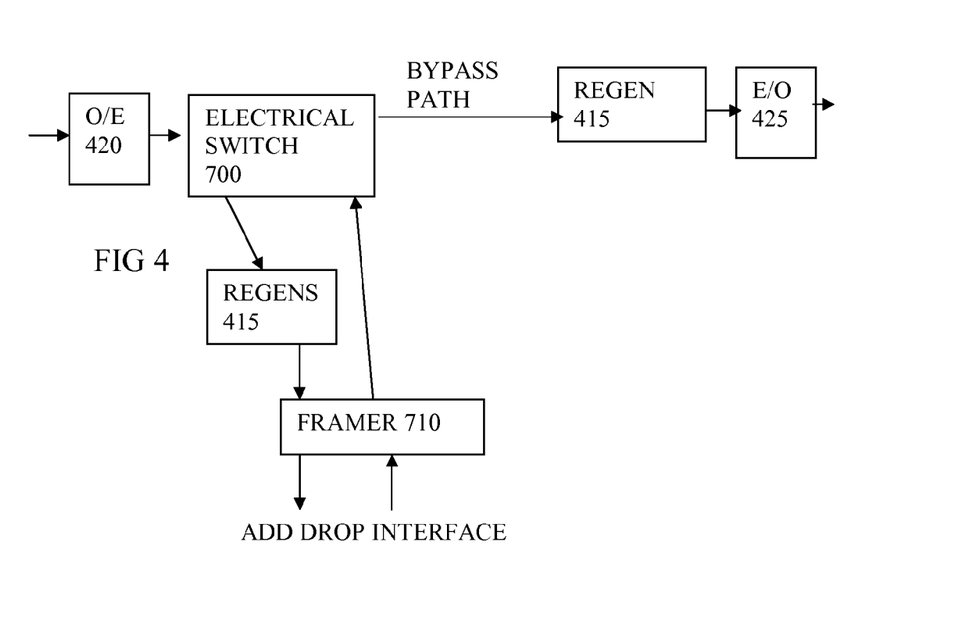

FIGS. 2, 3, and 4, Alternative Arrangements of a Switching Node

FIGS. 2, 3, and 4 show schematic views of alternative arrangements of a switching node according to embodiments of the invention. In FIG. 2, an input converter in the form of an optical to electrical converter 420 is shown, feeding electrical signals to an electrical switch and regenerator 730. This switches the signals to one of two paths shown. One of these paths goes to the framer 710, the other is the bypass path for signals avoiding the framer. The bypass path and the output of the framer lead to a second electrical switch 700. This can route either of these paths to an output converter in the form of an electrical to optical converter 425. Clearly there can be many optical input paths and many optical output paths. The optical signals can in some cases be WDM signals, in which case demultiplexing would be provided before the input converter, and multiplexing would be provided after the output converter. The regenerators in the switch can be arranged to regenerate some or all of the electrical signals received by the switch. The regenerators can be arranged to regenerate all the signals which are to be switched onto the bypass path. The regenerators can be 2R or 3R regenerators implemented following established practice.

The electrical switch can be arranged to switch on a wavelength basis, or some other unit.

FIG. 3 shows an alternative arrangement. In this case an input converter in the form of an optical to electrical converter 420 is shown, feeding electrical signals to an electrical switch 700 without a regenerator. This switch switches the signals to one of two paths shown. One of these paths goes to the framer 710, the other is the bypass path for signals avoiding the framer. The two paths are fed to different outputs, so there is no switch after the framer. The bypass path has its own regenerator 415, which then feeds regenerated signals to a first output converter 425. The output of the framer is fed to a second output converter 425.

FIG. 4 shows another alternative arrangement, this time with an add drop interface. In this case an input converter in the form of an optical to electrical converter 420 is shown, feeding electrical signals to an electrical switch 700 without a regenerator. This switch switches the incoming signals either to the bypass path or to the add drop interface via the framer 710. A regenerator 415 can be provided before the framer. Signals from the add drop interface are fed via the framer to the switch. In this case the switch will add these signals to the output path via a regenerator 415 and the output converter 425. For these added signals, the bypass path is a misnomer, as the added signals will have passed through the framer. Strictly speaking, the bypass path should apply just to the path through the switch taken by signals not added or dropped.

Figure 5:
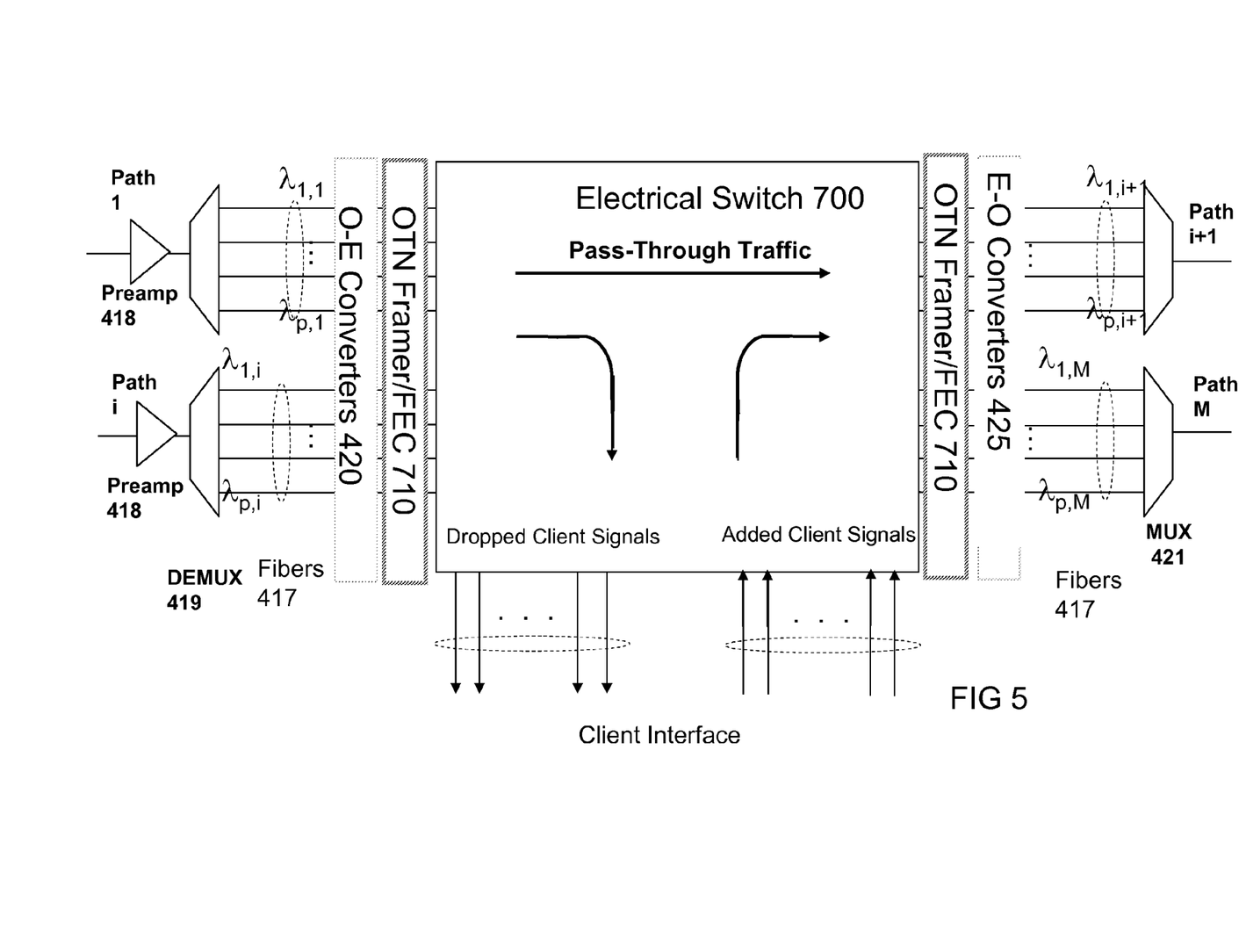
FIG. 5 shows a schematic view of an ROADM according to conventional practice.

FIG. 5, Add Drop Type Switching Node with Conventional Arrangement of Framer

Figure 6:
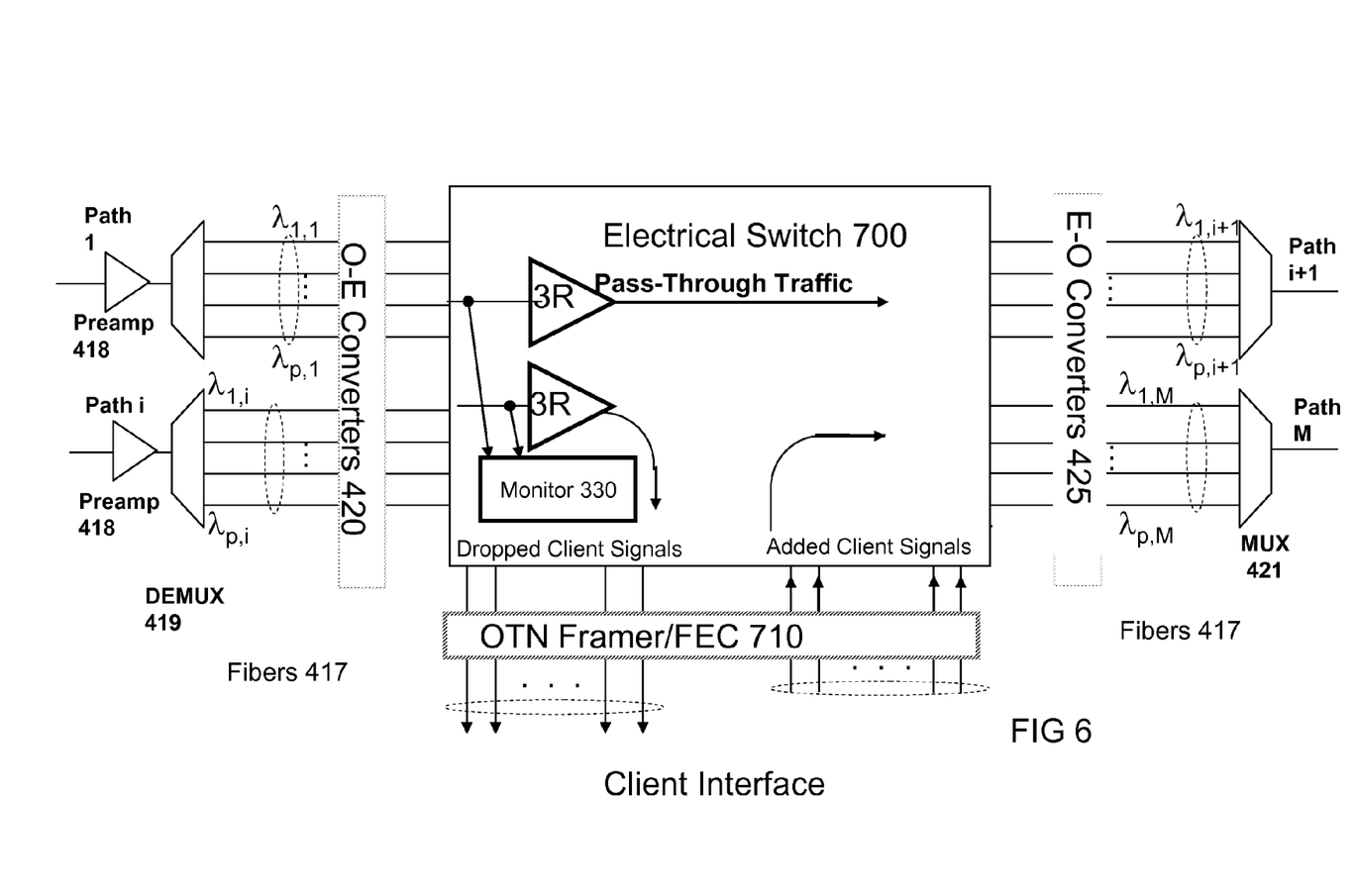
FIG. 6 shows a schematic view of an ROADM according to an embodiment.

FIG. 5 shows a schematic view of an ROADM according to conventional practice, for comparison with the embodiment of FIG. 6. In FIG. 5, the electrical switch 700 is arranged to pass through traffic or to add or drop traffic to an add drop interface in the form of a client interface. The switch is coupled to multiple incoming optical paths 1 . . . i. Each path can carry a WDM signal which is fed to an optical preamplifier 418 then a wavelength demultiplexer 419. Separated wavelengths are each fed on separate fibers 417 to input converters in the form of optical to electrical converters 420. The individual electrical signals are all fed to a framer 710 in the form of circuitry for OTN frame processing including FEC processing for example. The signal is then switched by the switch, either to pass through or to be dropped to the client interface.

Another framer 710 is provided at the output of the switch for processing signals corresponding to all the wavelengths to be output onto output optical paths i+1 . . . M. Clearly there need not be the same number of outputs as inputs. After the OTN frame processing, the output electrical signals are fed to output converters 425 and then optical signals at individual wavelengths are multiplexed into a WDM optical signal by multiplexer 421.

FIG. 6, Add Drop Type Switching Node with New Arrangement of Framer

FIG. 6 shows a schematic view of an ROADM according to an embodiment having an arrangement similar to that of FIG. 4, and contrasting with the conventional arrangement of FIG.

5, in ways which will now be explained. Compared to FIG. 5, the framer is now coupled at the add drop side of the switch, and no frame processing takes place on the electrical signals from the input converters to the switch, and from the switch to the output converters. Furthermore, 3R regenerators are shown as an option on the bypass path for pass through traffic, and on the drop path before the framer is reached. A monitor 330 can be coupled to monitor the electrical signals before regeneration, for analog signal characteristics which might indicate degradation of the optical path. This cannot be done effectively after the framer because the framer carries out some digital processing and so regenerates at least some parts of the signal.

In operation, as in the Digital ROADM of FIG. 5, the incoming multiplexed optical signals are demultiplexed and O-E converted. Then the electrical switch separates the transit wavelengths signals from the local dropped wavelengths: the transit wavelengths are 3R regenerated, spatially switched and E-O converted before the optical multiplexing and the subsequent onward transmission through the network. The local dropped wavelengths are also 3R regenerated and processed by OTN framers in transponder units which can be part of the add drop interface. Local wavelengths coming from transponders, that have to be added, are electrically switched, E-O converted and multiplexed together with the other transit wavelengths.

Although as described the switch is a wavelength switch, in principle, there can be other types of switching such as time division switching and so on.

These embodiments enable some of the best features of the all-optical ROADM node to be combined with those of the Digital ROADM, mitigating their major drawbacks. The All-Optical ROADM has the main advantage of featuring the lowest power consumption. This is achieved by avoiding OEO conversion and OTN processing of all the transit traffic. The main disadvantages are the probability of wavelength blocking, the OSNR degradation and the needs of implementing a complex sub-system for the monitoring of the overall optical signals.

On the other hand the Digital ROADM presents many advantages like easy signal monitoring in the electronic domain, the full non-blocking wavelength routing and the independency of the OSNR on the number of traversed nodes. These are achieved to the cost of substantially high power consumption due to the OEO conversion and even more to the OTN processing of all traffic.

The embodiments such as the 3R regenerated ROADM of FIG. 6 can have a power consumption lower than the digital solution due to the fact that it avoids OTN processing of transit traffic (i.e. the highest power consuming function in the ROADM). Nevertheless it can maintain the features of digital ROADMs of easier signal monitoring, non-blocking wavelength routing and OSNR independency by the number of nodes, due to the conversion of all signals in the electrical domain. Moreover the signal monitoring can be easily integrated in the CMOS circuits used for electrical switching and 3R regeneration. More efficiency in terms of energy consumption of telecom equipments can be useful in helping reduce Greenhouse Gas emissions.

Figure 7:
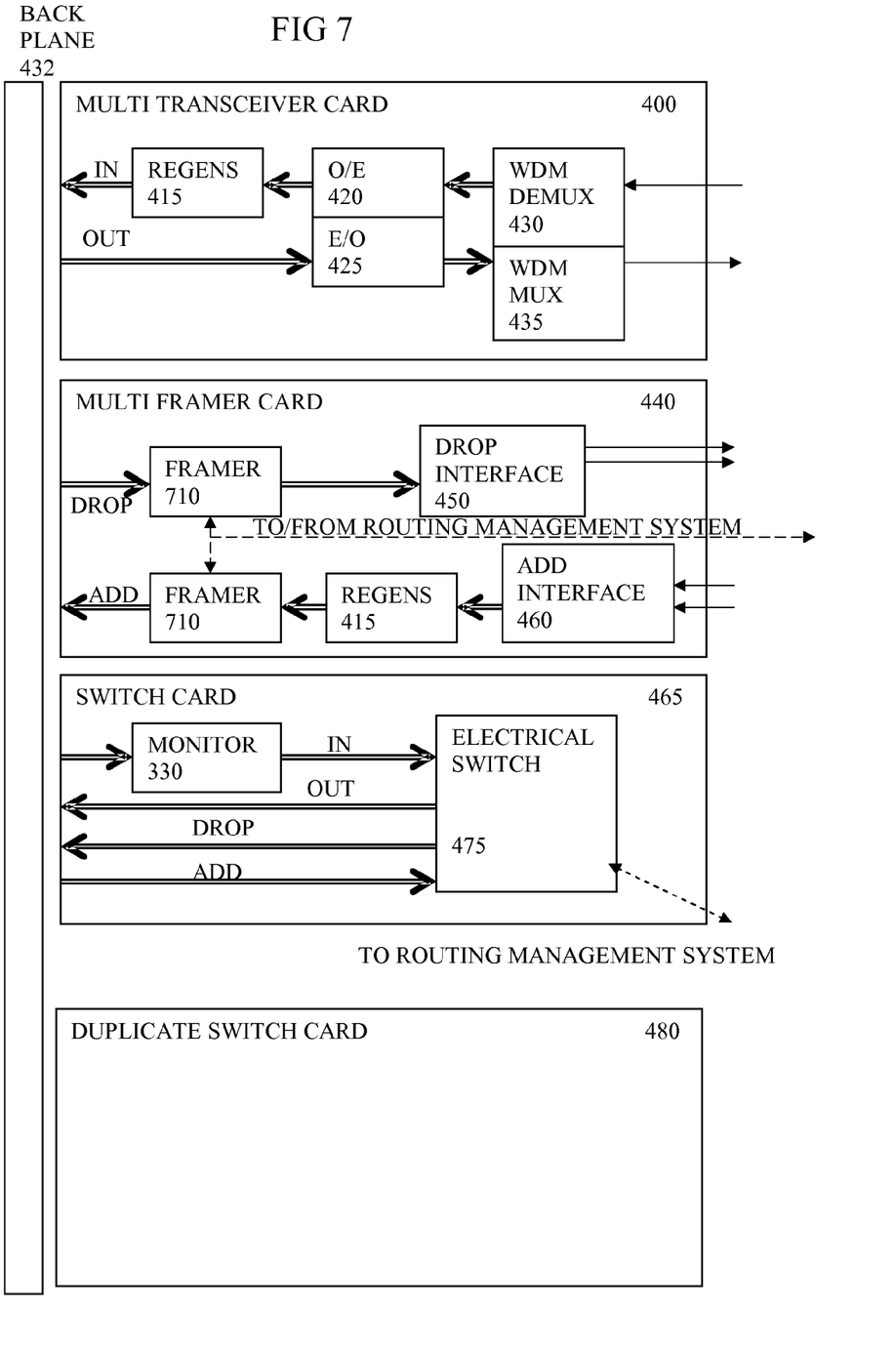
FIG. 7 shows a schematic view of an arrangement of cards to form a switching node according to an embodiment.
Figure 8:
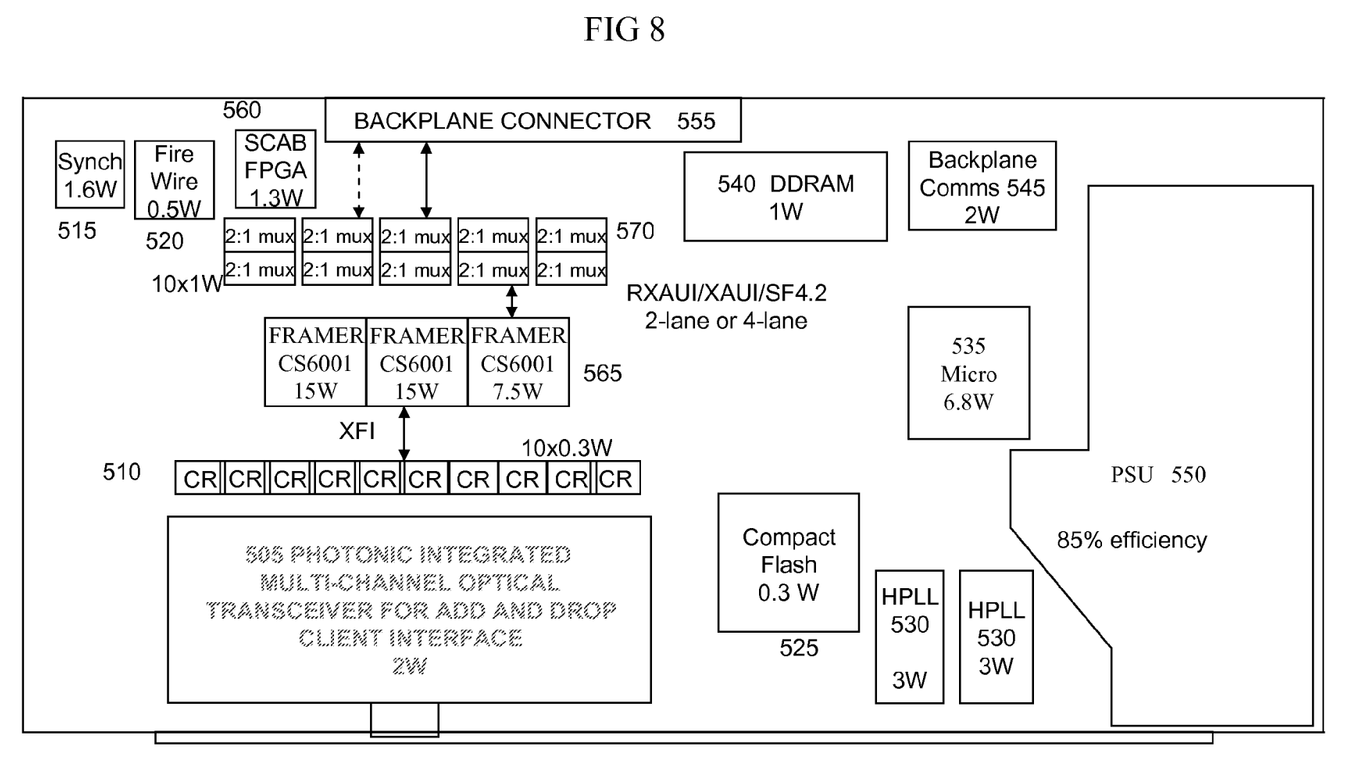
FIG. 8 shows a layout view of a multi framer card for the node of FIG. 7.
Figure 9:
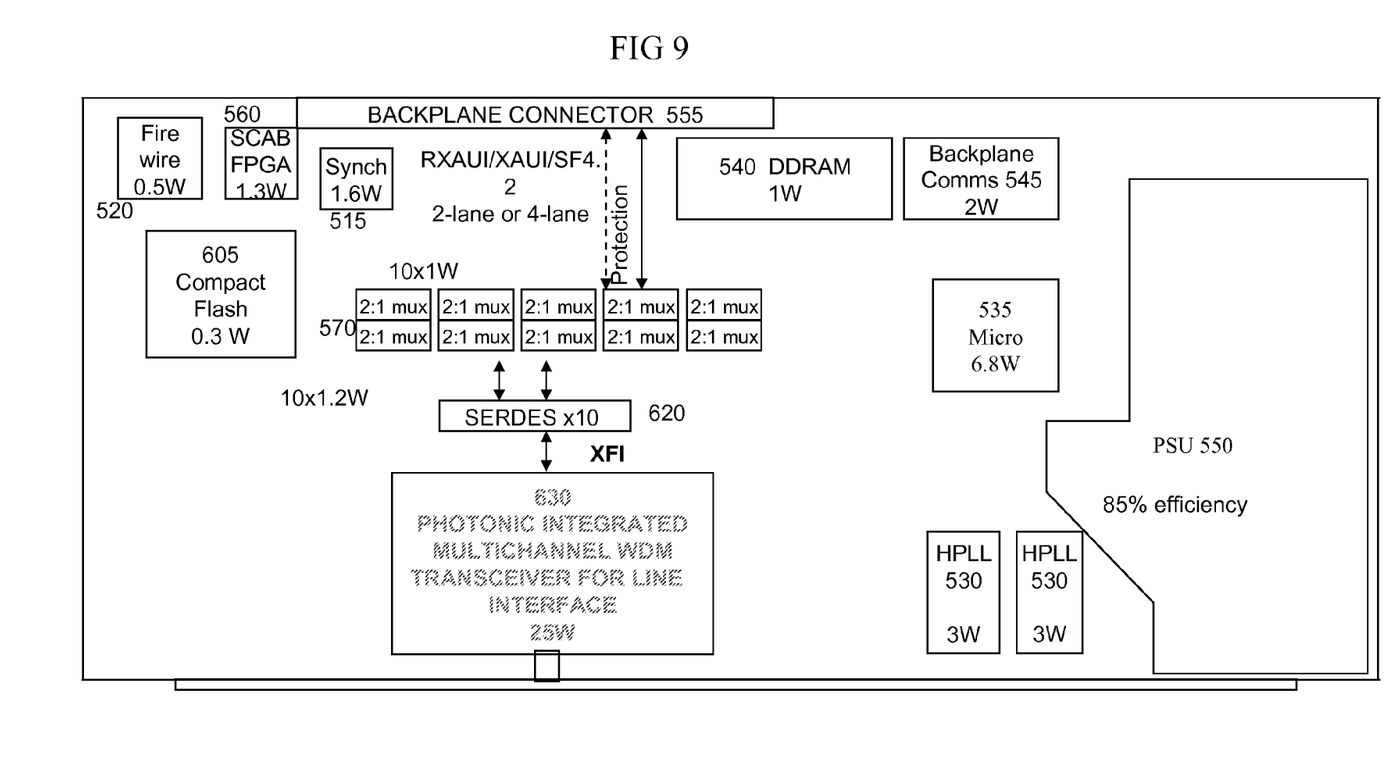
FIG. 9 shows a layout view of multi transceiver card for the node of FIG. 7, FIGS. 10 and 11 show schematic views of alternative arrangements of a switching node according to embodiments.

FIGS. 7, 8 and 9, Arrangement of Cards to Form a Switching Node Embodiment

FIG. 7 shows a schematic view of an arrangement of cards to form a switching node according to an embodiment, and FIGS. 8 and 9 shows layout views of a multi framer card and a multi transceiver card for the node of FIG. 7. In the switching node of FIG. 7, the parts are arranged as in FIG. 6, and similar reference numbers are used as applicable. FIG. 7 shows one possible implementation showing how the different parts can be spread across different cards. This arrangement is affected by having the framer at the add drop side as shown in FIG. 6. The switching node has a backplane 432, for providing electrical connections and mechanical support to a number of circuit cards. Four cards are shown, a multi transceiver card 400, a multi framer card 440, a switch card 465, and a duplicate switch card 480.

The multi transceiver card has an optical input at the right hand side, feeding the WDM demux 430. This card also has the WDM multiplexer 435, the input and output converters 420 and 425, and a regenerator 415 for the incoming electrical signals. The regenerated electrical input signals are fed to the backplane to enable connection to the switch card. Electrical output signals from the switch card are fed via the backplane to the multi transceiver card.

The multi framer card has the add/drop interface in the form of a drop interface 450 and an add interface 460. These interfaces may be optical or be other types such as electrical interfaces, depending on the client's local requirements. In principle they can be of the same type as the other optical inputs and outputs, in which case they are distinguished and identifiable as add drop interfaces only by the fact of being connected to local devices or networks rather than to other nodes of the optical network. The framers 710 are provided on both add and drop paths and a regenerator 415 may be provided before the framer on the add path. The framer can be provided with a communications link to and from the routing management system as shown, so that the management system can read from or write to the transport overhead information in the framing. The electrical add signals are fed from the multi framer card to the backplane to enable connection to the switch card. Electrical drop signals from the switch card are fed via the backplane to the multi framer card.

The switch card 465 shows the electrical switch 475 and its connections, an input via the monitor part 330, an output, and add and drop paths. This card and these parts can be implemented in various ways following established practice. The switch can be provided with a communications link to and from the routing management system as shown, so that the management system can read from or write to the switch to configure the routing. A duplicate switch card 480 can be provided for use as a back up in case of failure of the main switch card. This type of protection switching can be triggered in various ways, locally or centrally.

FIG. 8 shows a layout of the multi framer card, showing parts and in some cases, their likely power consumption, but not showing connections. This card includes a backplane connector 555, a power supply unit 550, and a micro processor 535. Associated with the micro processor is a compact flash memory 525, a backplane comms part 545 and DDRAM memory 540. Two phase locked loops 530 are shown, which can be used to lock the clocks on the board to a system clock. A synchronizing part 515 is for synchronizing signals to and from the backplane. A firewire communications part 520 and a SCAB FPGA part 560 can be used for card management and monitoring functions. These parts are ancilliary to the main functions of the card as shown in FIG. 7. The paths for communications traffic can include add drop interfaces in the form of a photonic integrated (PIC) multi-channel optical transceiver for the add and drop client interface 505, using whatever optical interface is suitable for the local optical line or network. Suitable integrated optical devices are available and are known to those skilled in the art and so will not be described in more detail. A bank of 3R regenerators with clock recovery 510, a bank of framer circuits 565 and a bank of 2:1 multiplexers and demultiplexers 570 can also be included in the paths for communications traffic as shown. The 2:1 multiplexers and demultiplexers provide switching to or from a redundant (or protection) path for protection switching for the signals fed to or from the backplane. Both a main path and its corresponding protection path, are coupled into the backplane, so that the main path goes to the switch card and the protection path goes to the duplicate switch card. Similar paths are provided for signals in the other direction. The add drop interface can of course be an electrical interface, or can be a non integrated optical interface using discrete optical parts if desired. This would typically use more power, and more space, but could be cheaper in some cases.

The framer circuit in this embodiment is a CS6001 chip made by Cortina Systems Inc. and more information is available from their website, www.cortina-systems.com. The CS6001 Transport Processor supports Core transport processing for various protocols:

Full SONET/SDH TOH processing of OC-768 and OC-192 signals (termination and generation)
Full G.709 compliant OxU2 and OxU3 overhead termination and generation
Asynchronous aggregation of four independent 10G class signals into a standard or an over-clocked OTU3
10GE LAN/WAN, FC-1200, and FC800 non-intrusive Performance Monitoring
Fully transparent and asynchronous mapping of one 40 Gbps or four 10 Gbps tributaries into an OTU3 or four independent OTU2s
Additional networking features supported include:
Known pattern (PRBS, constant bit patterns) processing on all streams and layers
Maintenance signal processing/propagation for SONET/SDH and OTN
Reverse multiplexing (40 Gbps to/from 4×10 Gbps) for DWDM and cross-connect applications
Substantial hardware support for G.709 and G.798 functions High Speed Interfaces
two sets of 17×3.5 Gbps-capable shared high-speed CML or LVDS configurable I/Os; each set could be configured for 40G or Nx10G (N=1, . . . , 4) class line or client ports as:
40G class SFI-5.1 compliant interface
40G class 16-lane client agnostic backplane interface (extended SFI-4.2)
Four independent 10G class backplane or chip to-chip interfaces with CML I/Os; each interface could be configured as a XAUI port or SFI-4.2 interface
Single 10G class 16-bit SFI-4.1 compliant parallel interface clocked at up to 800 MHz with LVDS I/O
Four independent 10G class XFI serial interfaces clocked at up to 12.5 Gbps
Optional DPSK, PSBT (ODB), or DQPSK differential precoders
16-bit general purpose microprocessor interface, Intel*-style and Motorola*-style, synchronous or asynchronous, interrupt driven or polling mode.

Alternative embodiments can use other types of framers, or a subset of the functions listed.

FIG. 9 shows a layout of the multi transceiver card, showing parts and in some cases, their likely power consumption, but not showing connections. Like the multi framer card, this multi transceiver card includes a backplane connector 555, a power supply unit 550, and a micro processor 535. The micro processor can be used for receiving and handling alerts from the OTN overhead processing, for managing the PIC, and monitoring and controlling temperature of parts and so on. Associated with the micro processor is a compact flash memory 605, a backplane comms part 545 and DDRAM memory 540. Two phase locked loops 530 are shown, a synchronizing part 515, a firewire communications part 520 and a SCAB FPGA part 560. The main paths for the communications traffic include a WDM muxer and demuxer and optical transceivers for the conversions to or from the optical domain, in the form of a photonic integrated (PIC) multichannel WDM transceiver 630.

Suitable devices are available and are known to those skilled in the art and so will not be described in more detail. As an alternative, this can be implemented in non integrated form as discrete optical devices, using various established technologies as would also be known to those skilled in the art. The PIC can be followed by a bank of SerDes devices 620, which are serializer-deserializer devices for converting the high rate electrical signals from the PIC into lower rate parallel signals, and vice versa in the other direction. These devices also implement the regeneration. Between the SerDes devices and the backplane there is a bank of 2:1 multiplexers and demultiplexers 570. As in FIG. 8, the 2:1 multiplexing is carried out in order to provide protection switching to or from a protection path going to or from the duplicate switch card via the backplane. The protection path can be used in case of a failure on the main path or in the switch card.

Figure 10:
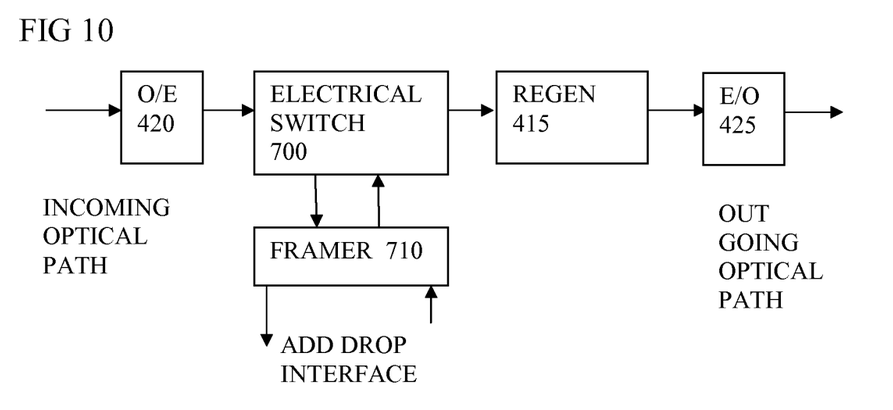
Figure 11:
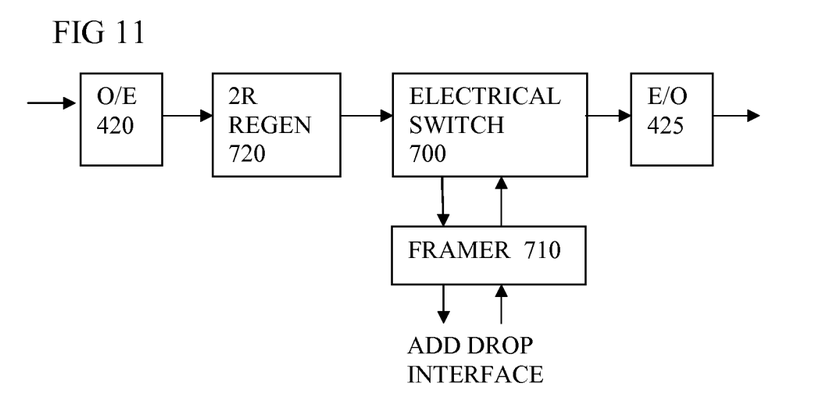

FIGS. 10 and 11, Further Alternative Arrangements of a Switching Node

FIGS. 10 and 11 show schematic views of alternative arrangements for the switching node according to embodiments of the invention. In FIG. 10, the arrangement is similar to FIG. 4, but no regeneration is provided on the incoming side of the switch, nor on the add drop paths. In FIG. 11, again the arrangement is similar to that of FIG. 4, but a regenerator 720 is provided on the incoming path or paths to the switch, and none is provided on the add drop side or the outgoing side. In this or any other of the arrangements, the regenerator is optionally a 2R regenerator 720.

An advantage of 3R regeneration vs 2R regeneration is that 3R regeneration allows longer reach thus enabling a larger network or improved performance of optical paths. 2R regeneration, even if so far studied and promoted, has not yet achieved any real commercial success due to intrinsic performance limitations.

An advantage of 3R regeneration on the bypass path avoiding OTN processing (according to some embodiments of the invention) vs 3R regeneration with OTN processing of all paths is lower power consumption. As the OTN framer is relatively power hungry, this saving of power consumption has associated consequences for lower costs, reduced mechanical design complexity, and reduced design effort.

If integrated optic parts are used for OEO conversion the reduced power consumption becomes even more useful. For non integrated optics, the cost and power consumption of OEO conversion is typically higher than power consumption by the OTN frame processing. So, once integrated optics is used, OEO conversion is much cheaper and power consuming, and the power consumption contribution of OTN processing becomes more noticeable.

Figure 12:
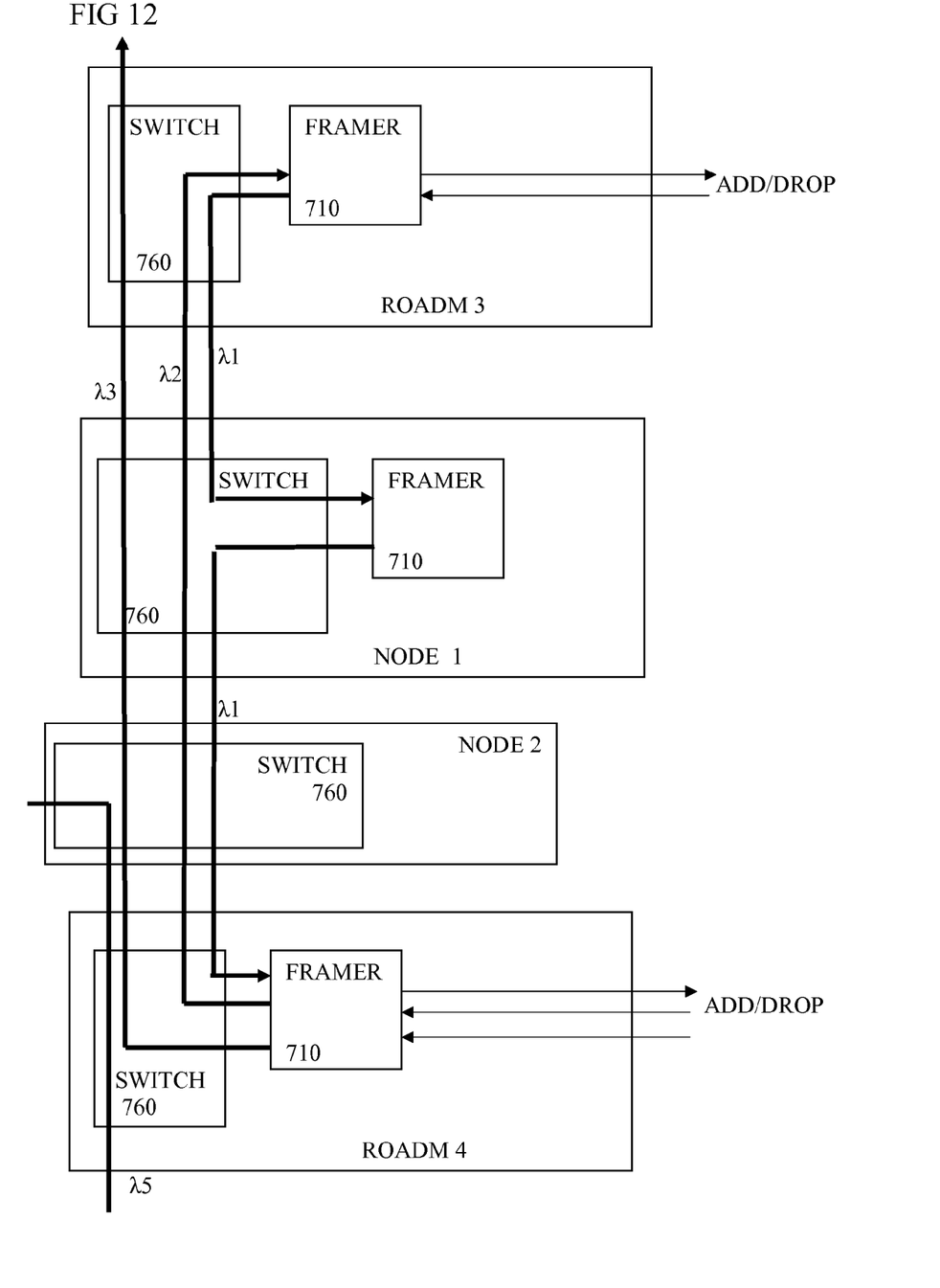
FIG. 12 shows a network view showing examples of routing of wavelengths via framers or bypassing framers in each node.

FIG. 12, Network View Showing Routing of Wavelengths

FIG. 12 shows a network view showing examples of routing of wavelengths via framers or bypassing framers in each node. This view shows part of an optical network having four nodes. WDM parts, O/E and E/O converters and optional regenerators are not shown for clarity. Various routes for different wavelengths are shown, to show some of the configuration possibilities. A first ROADM node 3 has a framer 710 on the add drop side of a switch 760. A second similar ROADM node 4 is also provided. Another node, node 1, has a switch and framer but no add drop. Node 2, has a switch and no framer and no add drop. The nodes shown can be part of a network having an arbitrary topology, such as a ring, a star, multiple rings and so on. As node 2 has no framer, it can optionally be implemented by an optical switch with no electrical conversion.

As can be seen, wavelength λ1 is added at ROADM 3, and switched to node 1 where it is switched to pass through the framer. It then passes through node 2 and is routed to be dropped at ROADM 4. At each node (except perhaps node 2) it will be converted and electrically switched, then reconverted to the optical domain. Wavelength λ2 is added at ROADM 4, is frame processed at ROADM 4 and switched towards node 2, which switches it towards node 1. Here it is switched to bypass the framer and is fed towards ROADM 3 where it is dropped after the frame processing in ROADM 3. This could be selected for bypassing because the client has opted for a lower quality of service for example, or could be selected for bypassing because the optical path quality is detected as being good, or to relieve a bottleneck in the framer perhaps. Whereas, λ1 could be selected for frame processing at node 1 perhaps because the client has selected a high quality of service, or because the optical path quality is less good at that wavelength for example.

Wavelength λ3 is added at ROADM 4, is frame processed at ROADM 4 and switched towards node 2 where it is switched towards node 1. At node 1 it is switched to bypass the framer and is fed towards ROADM 3 where it is switched to pass through an bypass the framer and is output to another node not shown. Wavelength λ5 is shown arriving at ROADM 4 from a node not shown, and is switched to pass through without being added or dropped, to reach node 2, where it is switched to another node not shown.

In practice there may be many wavelengths and the reconfiguration may be carried out continuously to make best use of the resources as demand changes, and as faults occur.

Figure 13:
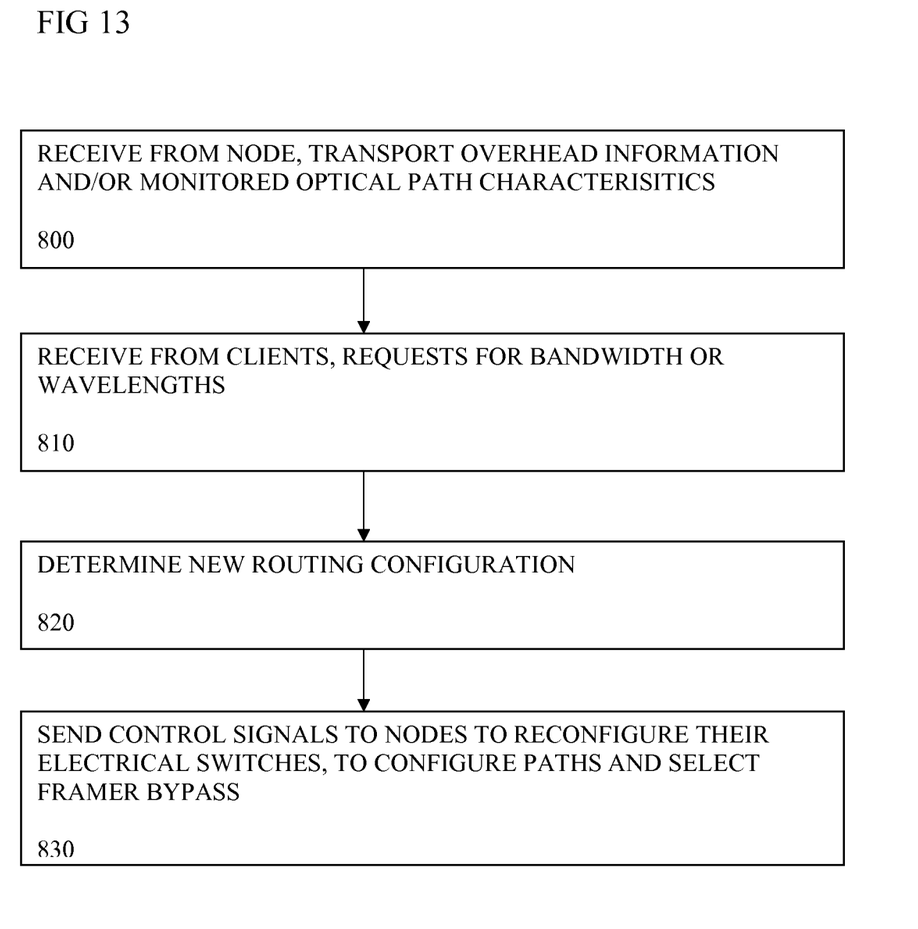
FIG. 13 shows steps in managing the routing configuration of a switching node according to another embodiment.

FIG. 13 shows steps in managing the routing configuration of a switching node FIG. 13 shows steps in managing the routing configuration of a switching node according to another embodiment. At step 800, the routing management system receives transport overhead information from a node, or receives monitored optical path characteristics, monitored from the analog electrical signal by monitor 330, or receives both. At step 810, at the same time or a different time, before or after, the management system receives requests for bandwidth of wavelengths from clients. On the basis of these inputs and the current configuration of wavelengths, the management system determines a new routing configuration at step 820. This can include determining whether particular wavelengths need to undergo framing processing at any node or whether they can be switched to bypass the framer at a given node. Then at step 830, the management system sends control signals to the electrical switches at some or all of the nodes to cause them to reconfigure their paths and to select framer bypass where appropriate, according to the new routing configuration.

Other variations and embodiments can be envisaged within the claims.

The invention claimed is:

1. A switching node for an optical communication system, the switching node comprising:
    an optical input path, and an optical output path, and at least one other output, of optical or other type;
    an input converter to convert optical signals on the optical input path to electrical input signals;
    an output converter to convert output electrical signals to output optical signals;
    an electrical switch, coupled to switch electrical signals from the input converter to a selected one of the outputs;
    a framer for reading or writing optical transport overhead information from or to the electrical signals;
    an interface for coupling the framer to the electrical switch, so as to provide a bypass path so that at least some of the signals being switched by the electrical switch can be switched selectively onto the bypass path to bypass the framer and be output without reading or writing of their optical transport overhead information; and
    an interface for coupling to a wavelength routing management system,
    wherein the interface for coupling to the wavelength routing management system is configured to receive control signals from the wavelength routing management system to configure the switching node subsystem to configure which of the electrical signals are added or dropped or passed through.

2. The switching node of claim 1, comprising a regenerator for analog regeneration of at least some of the electrical signals switched onto the bypass path.

3. The switching node of claim 2, the regenerator being arranged to retime pulses of at least some of the electrical signals.

4. The switching node of claim 1, arranged as a reconfigurable add drop multiplexer and having an add/drop interface,
    wherein the electrical switch is coupled to the input converter to selectively add electrical signals from the add/drop interface to the output converter, or to drop the electrical input signals to the add/drop interface, or to pass the electrical input signals through to the output converter.

5. The switching node of claim 4, wherein the framer is coupled at an add drop interface side of the electrical switch to read or write optical transport framing information from or to at least some of the electrical signals being added or dropped, and wherein the bypass path comprises a path for the electrical signals being passed through the add drop multiplexer without being added or dropped.

6. The switching node of claim 1, wherein the optical transport overhead information comprises any of forward error correction information, path monitoring information, quality of service information, tandem connection information, optical section information, optical subnetwork information, and protection switching information.

7. The switching node of claim 1, comprising a wavelength demultiplexer coupled to the optical input path for separating wavelengths from a wavelength multiplexed input optical signal.

8. The switching node of claim 7, wherein the electrical switch is arranged to switch the electrical signals to carry out wavelength routing of the separated wavelengths.

9. The switching node of claim 1, at least the input converter or output converter comprising a photonic integrated circuit.

10. The switching node of claim 1, having a monitor coupled to the electrical input signal for detecting optical characteristics of the input optical path based on the electrical input signal.

11. An optical communications system having multiple nodes, at least some of the nodes comprising a switching node according to claim 1.

12. A wavelength routing management system for an optical communications system having multiple nodes, at least some of the nodes including a switching node for an optical communication system, the switching node comprising:

an optical input path, and an optical output path, and at least one other output, of optical or other type;

an input converter to convert optical signals on the optical input path to electrical input signals;

an output converter to convert output electrical signals to output optical signals;

an electrical switch, coupled to switch electrical signals from the input converter to a selected one of the outputs; and a framer for reading or writing optical transport overhead information from or to the electrical signals, wherein the framer is coupled so as to provide a bypass path so that at least some of the signals being switched by the electrical switch can be switched selectively onto the bypass path to bypass the framer and be output without reading or writing of their optical transport overhead information, the wavelength routing management system comprising:

an interface for coupling to one or more of the switching nodes of the optical communications system, wherein the interface is configured:

to receive information based on optical transport overhead information received at the one or more of the switching nodes, or optical characteristics monitored at the one or more of the switching nodes; and to send control signals to configure the one or more of the switching nodes to configure which of the electrical signals are added or dropped or passed through.

13. A switching node subsystem comprising:

an add/drop interface;

an electrical switch, coupled to switch electrical signals from an input converter to a selected one of a plurality of outputs, wherein the input converter converts optical to electrical signals, and wherein the electrical switch is coupled to selectively add electrical signals from the add/drop interface to an output converter, or to drop the electrical input signals to the add/drop interface, or to pass the electrical signals through to the output converter;

a framer, coupled to the add/drop interface, for reading or writing optical transport overhead information from or to the electrical signals;

an interface for coupling the framer to the electrical switch, so as to provide a bypass path so that at least some of the signals being switched by the electrical switch can be switched selectively onto the bypass path to bypass the framer and be output without reading or writing of their optical transport overhead information; and an interface for coupling to a wavelength routing management system, wherein the interface for coupling to the wavelength routing management system is configured to receive control signals from the wavelength routing management system to configure the switching node subsystem to configure which of the electrical signals are added or dropped or passed through.

14. A method of configuring a switching node in an optical communications system having multiple nodes, at least some of the nodes comprising a switching node that comprises:

an optical input path, and an optical output path, and at least one other output, of optical or other type;

an input converter to convert optical signals on the optical input path to electrical input signals;

an output converter to convert output electrical signals to output optical signals;

an electrical switch, coupled to switch electrical signals from the input converter to a selected one of the outputs; and a framer for reading or writing optical transport overhead information from or to the electrical signals, wherein the framer is coupled so as to provide a bypass path so that at least some of the signals being switched by the electrical switch can be switched selectively onto the bypass path to bypass the framer and be output without reading or writing of their optical transport overhead information, the method comprising the steps of:

receiving, by a wavelength routing management system, information based on optical transport overhead information received at the node, or optical characteristics monitored at the node; and sending, by the wavelength routing management system, control signals to configure the switching node to configure which of the electrical signals are switched to bypass the framer.

* * * * *